US007200485B2

(12) United States Patent
Kennedy

(10) Patent No.: US 7,200,485 B2
(45) **Date of Patent: *Apr. 3, 2007**

(54) TRANSIENT SPEED-AND TRANSIENT LOAD-BASED COMPENSATION OF FUEL INJECTION PRESSURE

(75) Inventor: Michael P. Kennedy, Wheaton, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/254,480

(22) Filed: Oct. 19, 2005

(65) Prior Publication Data

US 2006/0064229 A1 Mar. 23, 2006

Related U.S. Application Data

(63) Continuation-in-part of application No. 10/947,917, filed on Sep. 23, 2004, now Pat. No. 6,988,029.

(51) Int. Cl.
*G06F 19/00* (2006.01)
*F02D 41/38* (2006.01)

(52) U.S. Cl. ....................... 701/103; 123/446; 701/115

(58) Field of Classification Search ................ 701/103, 701/104, 105, 110, 111, 115; 123/446, 492, 123/493, 458, 445, 456, 467
See application file for complete search history.

(56) References Cited

U.S. PATENT DOCUMENTS

| | | | | |
|---|---|---|---|---|
| 5,447,138 | A | 9/1995 | Barnes | |
| 5,529,044 | A | 6/1996 | Barnes et al. | |
| 6,035,829 | A * | 3/2000 | Hartke et al. | 123/447 |
| 6,367,452 | B1 * | 4/2002 | Shima et al. | 123/457 |
| 6,850,832 | B1 | 2/2005 | Rodriguez et al. | |
| 6,988,029 | B1 * | 1/2006 | Kennedy | 701/103 |

* cited by examiner

*Primary Examiner*—Willis R. Wolfe, Jr.
(74) *Attorney, Agent, or Firm*—Susan L. Lukasik; Elias P. Soupos; Jeffrey P. Calfa

(57) ABSTRACT

An engine (10) has a fueling system that uses hydraulic fluid to force fuel into engine combustion chambers via fuel injectors. Pressure of the hydraulic fluid is determined by a steady state strategy (ICP_DES_1) and a transient strategy (34, 36) that develops transient data values to account for certain transients in engine operation by processing engine speed data and data representing rate of change of engine speed, and data representing engine fueling to develop sub-strategy data values (ICP_FF_TS, ICP_FF_TL) for a transient component. The data values ICP_DES_1, ICP_FF_TS, and ICP_FF_TL are algebraically summed to develop a data value (ICP_DES_2) for a transient-modified desired hydraulic fluid pressure that is compared with a data value for actual hydraulic fluid pressure (ICP) to develop a data value for an error signal ICP_ERR. The data value for the error signal is processed according to a closed-loop strategy to develop a data value that controls the hydraulic fluid pressure.

20 Claims, 1 Drawing Sheet

TRANSIENT SPEED-AND TRANSIENT LOAD-BASED COMPENSATION OF FUEL INJECTION PRESSURE

REFERENCE TO A RELATED APPLICATION AND PRIORITY CLAIM

This application is a continuation-in-part, and claims priority, of application Ser. No. 10/947,917, filed 23 Sep. 2004, now U.S. Pat. No. 6,988,029.

FIELD OF THE INVENTION

This invention relates generally to internal combustion engines for propelling motor vehicles, and particularly to fueling strategies for such engines. More specifically it relates to a strategy for modifying fuel injection pressure during certain engine speed and engine load transients in order to improve engine performance by reducing, and ideally eliminating, any tendency of the engine to stumble and/or generate extra exhaust smoke during such speed transients.

BACKGROUND OF THE INVENTION

Certain diesel engines have fuel injection systems that utilize hydraulic fluid (oil) under pressure to force fuel into engine combustion chambers. The hydraulic fluid is supplied to a respective fuel injector at each engine cylinder. When a valve mechanism of a fuel injector is operated by an electric signal from an engine control system to inject fuel into the respective cylinder, the hydraulic fluid is allowed to act on a piston in the fuel injector to force a charge of fuel into the respective combustion chamber.

A fuel injection control strategy may include a strategy for controlling the pressure of the hydraulic fluid that is supplied to the fuel injectors. The pressure may vary depending on the values of certain input data utilized in the control strategy. One type of hydraulic system for controlling the pressure comprises a regulator valve that is controlled by the engine control system's execution of the pressure control strategy. If a fuel injector comprises an intensifier piston that forces the ejection of fuel from the injector, the pressure applied to the fuel will be some multiple of the hydraulic pressure applied by the hydraulic system to the fuel injector.

The pressure control strategy may utilize closed-loop control that seeks to secure correspondence of actual pressure to a desired control pressure. However, to enhance performance, the control strategy may include a feed-forward component that improves response to changing inputs that influence control pressure.

Other types of fuel injection systems regulate the injection pressure directly at a fuel rail or fuel manifold that serves the injectors that are connected to it.

SUMMARY OF THE INVENTION

The present invention relates to an injection pressure control strategy that can further improve response to changing inputs that influence control pressure. In particular, the inventive strategy relates to the inclusion of one or more maps, based on engine speed, that provide a respective data component for algebraic summing with a calculated data value for desired control pressure to compensate that calculated data value for engine acceleration and deceleration. The calculated data value that is being modified by the invention is based in large part, although not necessarily exclusively, on steady state engine operation where parameters such as speed are substantially constant.

The present invention can attenuate, and ideally eliminate, undesired effects on tailpipe emissions and/or drivability of a motor vehicle being propelled by the engine when the engine accelerates or decelerates. One map utilizes engine speed and rate of change of engine speed as inputs. Another map utilizes engine speed and rate of change of engine fueling, and therefore load, as inputs.

Accordingly, one generic aspect of the present invention relates to an internal combustion engine comprising a fueling system that forces fuel under pressure into engine combustion chambers via fuel injectors and an engine control system for controlling various aspects of engine operation including injection pressure at which fuel is injected into the engine combustion chambers.

The control system comprises a steady state strategy for processing certain data to develop a data value for desired steady state injection pressure based on steady state engine operation and a transient strategy for developing transient data values to account for certain transients in engine operation by processing engine speed data and data representing rate of change in at least one of engine speed and engine fueling to develop a data value for a transient component.

The control system modifies the data value for desired steady state injection pressure based on steady state engine operation by the data value for the transient component to develop a data value for a transient-modified desired injection pressure, compares the transient-modified desired injection pressure with a data value for actual injection pressure to develop a data value for an error signal, and processes the data value for the error signal through a closed-loop strategy to develop a data value for control of the injection pressure.

Another generic aspect relates to the control system just described.

Still another generic aspect relates to the method for hydraulic pressure control performed by the control system.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
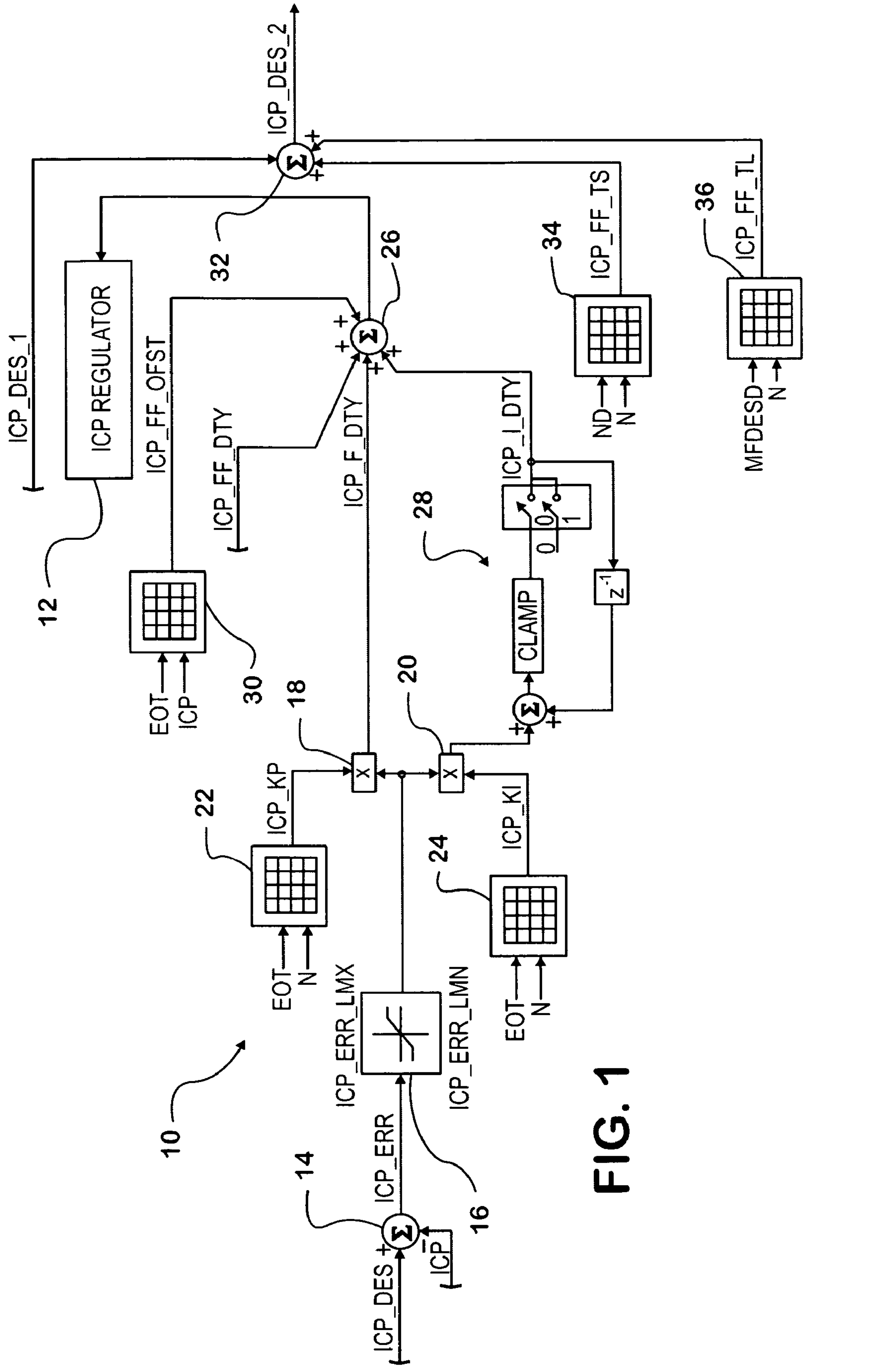
FIG. 1 is a general schematic diagram of a presently preferred embodiment of pressure control strategy according to the present invention.

Engine fuel injectors are under the control of an engine control system that comprises one or more processors that process various data to develop data for controlling various aspects of engine operation including controlling pressure of hydraulic fluid supplied to the fuel injectors and the timing of operation of valve mechanisms in the fuel injectors. The engine comprises a hydraulic system that pressurizes the hydraulic fluid and controls the hydraulic fluid pressure. When a valve mechanism of a fuel injector is operated by an electric signal from the engine control system to inject fuel into the respective cylinder, the hydraulic fluid is enabled to act on a piston in the fuel injector to force a charge of fuel into the respective combustion chamber.

An example of a pressure control strategy 10 that includes principles of the inventive strategy is disclosed in FIG. 1. The pressure control strategy is part of a comprehensive engine control strategy implemented by algorithms that are repeatedly executed by a processor, or processors, of the engine control system.

The strategy controls hydraulic fluid pressure by control of an electric operated regulator valve that regulates the pressure of fluid being pumped by an engine-driven hydraulic pump. That valve and related components, such as a driver that drives a solenoid of the valve, are represented by an IPR regulator 12.

Closed-loop control of the valve is accomplished by an error signal ICP_ERR whose data value is calculated by subtracting the data value for actual injection control pressure ICP from the data value for desired injection control pressure ICP_DES_2 via an algebraic summing function 14. The data value for ICP is provided by a pressure sensor.

The data value for ICP_ERR is evaluated against maximum and minimum limits ICP_ERR_LMX and ICP_ERR_LMN by an evaluation function 16 to assure that it is within predefined limits, and if it is not to then limit it value to the data value of the appropriate one of the two limits.

Because the particular closed-loop strategy shown here employs both proportional and integral control components, the data value for ICP_ERR that results from evaluation function 16 is multiplied by a proportional gain factor ICP_KP for the proportional control component using a multiplication function 18 and by an integral gain factor ICP_KI for the integral control component using another multiplication function 20. Each of the two factors is a function of engine temperature EOT and engine speed N, and so a respective map 22, 24 that uses engine temperature EOT and engine speed N as inputs provides the corresponding factor based on those two parameters.

The product of ICP_KP and ICP_ERR is designated ICP_P_DTY and forms one input to a summing function 26 and the integral of the product of ICP_KI and ICP_ERR, as integrated by an integral function 28, is designated ICP_I_DTY and forms another input to summing function 26. Two other data inputs to summing function 26 are provided by a parameter designated ICP_FF_DTY and a parameter designated ICP_FF_OFST.

ICP_FF_DTY represents a feed-forward control component that provides some degree of open loop control that renders the strategy more response to certain changing conditions. The data value for ICP_FF_DTY is calculated by an appropriate algorithm that is based on those conditions. The data value for ICP_FF_OFST is a function of engine temperature and actual injection control pressure and serves to compensate for the influence of those parameters on physical characteristics of the hydraulic fluid. A map 30 that uses engine temperature EOT and actual injection control pressure ICP as inputs provides a data value for ICP_FF_OFST based on those inputs.

The data value for the sum provided by summing function 26 controls ICP regulator 12 so that the regulator valve provides actual injection control pressure corresponding to the desired injection control pressure ICP_DES_2.

Data values for desired injection control pressure ICP_DES_2 are provided by a summing function 32 that sums a data value for a parameter ICP_DES_1, a data value for a parameter ICP_FF_TS, and data value for a parameter ICP_FF_TL. The latter two parameters ICP_FF_TS and ICP_FF_TL relate to improvements provided by incorporation of principles of the present invention in the control of injection control pressure. Both parameters ICP_FF_TS and ICP_FF_TL are based on engine speed N, and each parameter may be considered a sub-component of the transient strategy. The data value for ICP_DES_1 is the result of processing certain data according to a steady state strategy that determines an appropriate steady state value for injection control pressure based in large part, although not necessarily exclusively, on constant engine speed and fueling. Because the inventive strategy is invoked during transient operation, the calculated data value for ICP_DES_1 may change as execution of the steady state iterates during transients.

A data value for ICP_FF_TS is obtained from a map 34 that contains multiple data values for ICP_FF_TS, each of which is correlated with both a data value for engine speed N falling within a particular range of engine speeds and a data value for rate of change in engine speed ND (i.e., engine acceleration/deceleration) falling within a particular range of engine acceleration/deceleration. In other words, for various combinations of engine speed and acceleration/deceleration, there is a corresponding data value for ICP_FF_TS.

A data value for ICP_FF_TL is obtained from a map 36 that contains multiple data values for ICP_FF_TL, each of which is correlated with both a data value for engine speed N falling within a particular range of engine speeds and a data value for rate of change in engine fueling MFDESD (which may also be considered to approximate rate of change in engine load) falling within a particular range of fueling rate change. In other words, for various combinations of engine speed and rate of fueling change, there is a corresponding data value for ICP_FF_TL.

As engine speed N changes, map 34 provides a data value for ICP_FF_TS that is correlated with speed and the rate at which the engine is accelerating or decelerating. That data value is algebraically summed with the data value for ICP_DES_1.

As engine speed N changes, map 36 provides a data value for ICP_FF_TL that is correlated with speed and the rate at which the engine fueling is changing. That data value is also algebraically summed with the data value for ICP_DES_1.

The result of the summation of ICP_FF_TS and ICP_FFTL with ICP_DES_1 creates a data value for ICP_DES_2.

Data values for the respective maps 34, 36 are determined empirically by testing in a vehicle, by engineering calculations, and/or a combination of both. When the engine is running at a steady speed, both maps will typically provide data values of zero, thereby not modifying the steady state calculated value ICP_DES_1. As the engine accelerates or decelerates, the calculated steady state value ICP_DES_1 will be modified by the summation of a data vale from one or both maps 34, 36 with that steady state value. It should be understood that the steady state value ICP_DES_1 does not necessarily remain constant during a speed change because the data value for ICP_DES_1 is being updated at the rate at which the pressure control strategy iterates.

The inventive strategy is effective to counteract incipient engine stumbling and extra smoke generation by accounting for unique operating conditions that occur during speed transients and tend to cause stumbling and extra exhaust smoke. The invention is especially useful in diesel engines.

Principles of the invention can also be embodied in a different type of fuel injection system where pressure of fuel in a fuel rail that serves a number of fuel injectors connected to it is regulated and compensated for transients. Instead of controlling fuel injection pressure by controlling pressure of hydraulic control fluid applied to the fuel injectors, as described above, this different type of system directly controls fuel injection pressure, making delivery of hydraulic control fluid to the fuel injectors unnecessary.

While a presently preferred embodiment of the invention has been illustrated and described, it should be appreciated that principles of the invention apply to all embodiments falling within the scope of the following claims.

What is claimed is:

1. An internal combustion engine comprising:

a fueling system for forcing fuel under pressure into engine combustion chambers via fuel injectors;

an engine control system for controlling various aspects of engine operation including injection pressure at which fuel is injected into the engine combustion chambers by the fuel injectors;

wherein the control system comprises a steady state strategy for processing certain data to develop a data value for desired steady state injection pressure based on steady state engine operation and a transient strategy for developing transient data values to account for certain transients in engine operation by processing engine speed data and data representing rate of change in at least one of engine speed and engine fueling to develop a data value, for a transient component; and wherein the control system modifies the data value for desired steady state injection pressure based on steady state engine operation by the data value for the transient component to develop a data value for a transient-modified desired injection pressure, compares the transient-modified desired injection pressure with a data value for actual injection pressure to develop a data value for an error signal, and processes the data value for the error signal through a closed-loop strategy to develop a data value for control of the injection pressure.

2. An engine as set forth in claim 1 wherein the control system comprises a map containing data values for the transient component, each of which is correlated with engine speed and the rate at which the engine speed is changing, and the control system selects from the map a data value for the transient component that is correlated with a data value for present engine speed and a data value for present rate of change of engine speed.

3. An engine as set forth in claim 1 wherein the control system comprises a map containing data values for the transient component, each of which is correlated with engine speed and the rate at which the engine fueling is changing, and the control system selects from the map a data value for the transient component that is correlated with a data value for present engine speed and a data value for present rate of change of engine fueling.

4. An engine as set forth in claim 1 wherein the control system comprises two maps each of which contains respective data values for a sub-component of the transient component, and in one of which the data values for the sub-component are correlated with engine speed and the rate at which the engine speed is changing, and in the other of which the data values for the sub-component are correlated with engine speed and the rate at which the engine fueling is changing, and the control system selects from the one map a sub-component data value that is correlated with a data value for present engine speed and from the other map a sub-component data value that is correlated with a data value for present engine speed and a data value for present rate of change of engine fueling and algebraically sums the sub-component data values selected from the two maps to form the data value for the transient component.

5. An engine as set forth in claim 1 wherein the closed-loop strategy comprises, a proportional component and an integral component, each having a respective gain that is correlated with both engine speed and engine temperature.

6. An engine as set forth in claim 1 wherein control system's modification of the data value for desired steady state injection pressure based on steady state engine operation by the data value for the transient component comprises algebraically summing the data value for desired steady state injection pressure based on steady state engine operation and the data value for the transient component.

7. An engine as set forth in claim 6 wherein the control system also processes certain data to develop a data value for a feed-forward open-loop component and algebraically sums the last-mentioned data value with the data value for desired steady state injection pressure based on steady state engine operation and the data value for the transient component.

8. A control system for an internal combustion engine that has a fueling system that forces fuel into engine combustion chambers via fuel injectors under injection pressure and is controlled by the control system, the control system comprising:

a steady state strategy for processing certain data to develop a data value for desired steady state injection pressure based on steady state engine operation and a transient strategy for developing transient data values to account for certain transients in engine operation by processing engine speed data and data representing rate of change in at least one of engine speed and engine fueling to develop a data value for a transient component; and wherein the control system modifies the data value for desired steady state injection pressure based on steady state engine operation by the data value for the transient component to develop a data value for a transient-modified desired injection pressure, compares the transient-modified desired injection pressure with a data value for actual injection pressure to develop a data value for an error signal, and processes the data value for the error signal through a closed-loop strategy to develop a data value for injection pressure.

9. A control system as set forth in claim 8 comprising a map containing data values for the transient component, each of which is correlated with engine speed and the rate at which the engine speed is changing, and wherein the control system selects from the map a data value for the transient component that is correlated with a data value for present engine speed and a data value for present rate of change of engine speed.

10. A control system as set forth in claim 8 comprising a map containing data values for the transient component, each of which is correlated with engine speed and the rate at which the engine fueling is changing, and wherein the control system selects from the map a data value for the transient component that is correlated with a data value for present engine speed and a data value for present rate of change of engine fueling.

11. A control system as set forth in claim 8 comprising two maps each of which contains respective data values for a sub-component of the transient component, and in one of which the data values for the sub-component are correlated with engine speed and the rate at which the engine speed is changing, and in the other of which the data values for the sub-component are correlated with engine speed and the rate at which the engine fueling is changing, and wherein the control system selects from the one map a sub-component data value that is correlated with a data value for present engine speed and from the other map a sub-component data value that is correlated with a data value for present engine speed and a data value for present rate of change of engine fueling and algebraically sums the sub-component data values selected from the two maps to form the data value for the transient component.

12. A control system as set forth in claim 8 wherein the closed-loop strategy comprises a proportional component and an integral component, each having a respective gain that is correlated with both engine speed and engine temperature.

13. A control system as set forth in claim 8 wherein control system's modification of the data value for desired steady state injection pressure based on steady state engine operation by the data value for the transient component comprises algebraically summing the data value for desired steady state injection pressure based on steady state engine operation and the data value for the transient component.

14. A control system as set forth in claim 13 wherein the control system also processes certain data to develop a data value for a feed-forward open-loop component and algebraically sums the last-mentioned data value with the data value for desired steady state injection pressure based on steady state engine operation and the data value for the transient component.

15. A method for control of injection pressure at which fuel is injected into combustion chambers of an internal combustion engine via fuel injectors, the method comprising:

processing data according to a steady state strategy to develop a data value for desired steady state injection pressure based on steady state engine operation and processing data according to a transient strategy to develop transient data values to account for certain transients in engine operation by processing engine speed data and data representing rate of change in at least one of engine speed and engine fueling to develop a data value for a transient component; and modifying the data value for desired steady state injection pressure based on steady state engine operation by the data value for the transient component to develop a data value for a transient-modified desired injection pressure, comparing the transient-modified desired injection pressure with a data value for actual injection pressure to develop a data value for an error signal, and processing the data value for the error signal according to a closed-loop strategy to develop a data value for pressure control, and using the data value for pressure control to control the injection pressure.

16. A method as set forth in claim 15 comprising selecting from a map containing data values for the transient component, each of which is correlated with engine speed and the rate at which the engine speed is changing a data value for the transient component that is correlated with a data value for present engine speed and a data value for present rate of change of engine speed.

17. A method as set forth in claim 15 comprising selecting from a map containing data values for the transient component, each of which is correlated with engine speed and the rate at which the engine fueling is changing, a data value for the transient component that is correlated with a data value for present engine speed and a data value for present rate of change of engine fueling.

18. A method as set forth in claim 15 comprising selecting from each of two maps each of which contains respective data values for a sub-component of the transient component, one of which maps contains data values for the sub-component correlated with engine speed and the rate at which the engine speed is changing, and the other of which maps contains data values for the sub-component correlated with engine speed and the rate at which the engine fueling is changing, a respective sub-component data value that is correlated respectively with a data value for present engine speed and a sub-component data value that is correlated with a data value for present engine speed and a data value for present rate of change of engine fueling, and algebraically summing the selected sub-component data values to form the data value for the transient component.

19. A method as set forth in claim 15 wherein the step of modifying the data value for desired steady state injection pressure based on steady state engine operation by the data value for the transient component comprises algebraically summing the data value for desired steady state injection pressure based on steady state engine operation and the data value for the transient component.

20. A method as set forth in claim 19 further including the step of processing certain data to develop a data value for a feed-forward open-loop component and algebraically summing the last-mention data value with the data value for desired steady state injection pressure based on steady state engine operaton and the data value for the transient component.

* * * * *